(12) United States Patent
Brimeyer et al.

(10) Patent No.: US 8,973,345 B2
(45) Date of Patent: Mar. 10, 2015

(54) DRIVE ASSEMBLY FOR AN AGRICULTURAL HARVESTING PLATFORM

(71) Applicant: Deere & Company, Moline, IL (US)

(72) Inventors: Alex Brimeyer, Bettendorf, IA (US); Dirk Weichholdt, Woelfling les Sarreguemi (FR); Luis L Losa, Madrid (ES); Friedrich Meyer-Hamme, Homburg (DE)

(73) Assignee: Deere & Company, Moline, IL (US)

( * ) Notice: Subject to any disclaimer, the term of this patent is extended or adjusted under 35 U.S.C. 154(b) by 118 days.

(21) Appl. No.: 13/759,509

(22) Filed: Feb. 5, 2013

(65) Prior Publication Data
US 2014/0215991 A1    Aug. 7, 2014

(51) Int. Cl.
  *A01D 34/30*   (2006.01)
  *A01D 34/02*   (2006.01)
  *A01D 41/14*   (2006.01)

(52) U.S. Cl.
  CPC ............. *A01D 34/02* (2013.01); *A01D 34/30* (2013.01); *A01D 41/142* (2013.01)
  USPC .......................................................... 56/257

(58) Field of Classification Search
  CPC ....... A01D 34/30; A01D 34/38; A01D 34/16; A01D 34/135; A01D 41/00; A01D 41/14; A01D 41/142; A01D 41/148; A01F 12/10
  USPC ........ 56/13.6, 14.6, 14.7, 208, 221, 259, 297, 56/257, 264, 304, 296, 298, 299, 307; 460/13, 69, 70, 101; 474/85, 87
  See application file for complete search history.

(56) References Cited

U.S. PATENT DOCUMENTS

| | | | |
|---|---|---|---|
| 3,577,716 A | 5/1971 | McCarty | |
| 5,463,857 A * | 11/1995 | Blosser | ........................... 56/238 |
| 5,497,605 A | 3/1996 | Underwood et al. | |
| 6,889,492 B1 | 5/2005 | Polk et al. | |
| 7,082,742 B2 | 8/2006 | Schrattenecker | |
| 7,658,059 B2 | 2/2010 | Majkrzak | |
| 7,730,702 B2 | 6/2010 | Mortier et al. | |
| 7,845,253 B2 | 12/2010 | Gil et al. | |
| 2009/0145097 A1 | 6/2009 | Priepke | |

FOREIGN PATENT DOCUMENTS

WO    2012166629 A1    12/2012

OTHER PUBLICATIONS

German Application DE 10 2012 204 869 A1, filed on Mar. 27, 2012, English Abstract Attached (16 pages).
European Search Report dated Jul. 24, 2014 (6 pages).

* cited by examiner

*Primary Examiner* — Robert Pezzuto

(57) ABSTRACT

A drive arrangement for driving a first sickle bar section (42) and a second sickle bar section (36) of a harvesting platform (20) comprises a first gearbox (54) and the second gearbox (74) having an output drivingly connected to a respective first end of a respective sickle bar section (36, 42). Drive trains connect the first gearbox (54) and the second gearbox (74) to an input drive shaft (24). At least one of the drive trains comprises a belt drive. A synchronization transmission (82) is coupled to the second ends of the sickle bar sections (36, 42) and couples them in opposite movement directions.

9 Claims, 5 Drawing Sheets

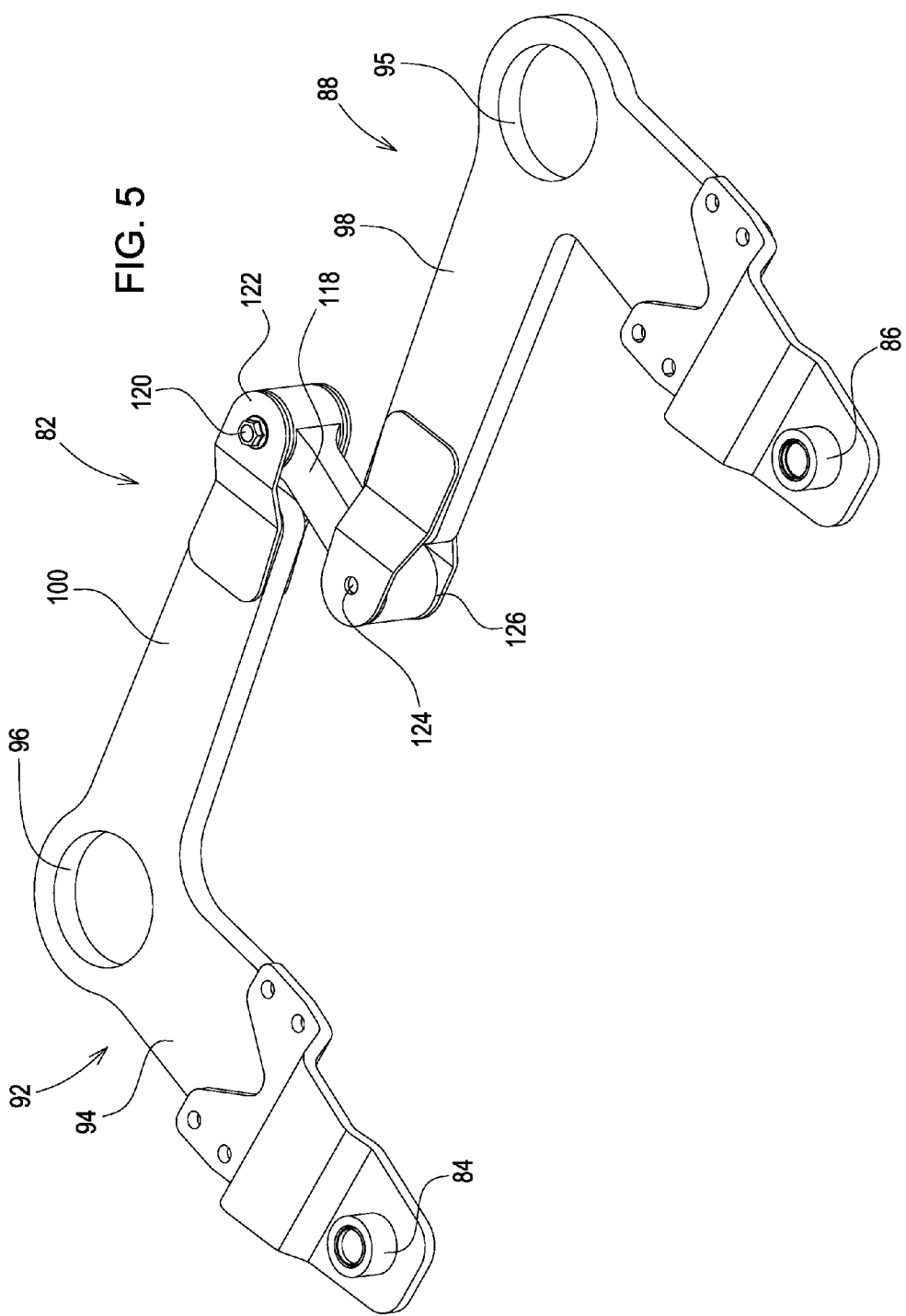

DRIVE ASSEMBLY FOR AN AGRICULTURAL HARVESTING PLATFORM

FIELD

This invention relates to agricultural harvesters. More particularly it relates to drive assemblies for driving the sickle bar of a harvesting platform.

BACKGROUND

Agricultural harvesters typically comprise a self-propelled combine with crop threshing, separating, or cleaning equipment, and a platform header attached to the front of the vehicle that the vehicle carries through the field. The harvesting platform cuts the crop by means of a sickle bar and conveys it to the center of the header using belt or auger conveyors.

The sickle bar comprises a number of knifes mounted on a support bar reciprocating in the lateral direction and driven by a transmission mounted on a lateral end of the header. The transmission is driven by a mechanical drive train from a feeder house of the combine. With increasing width of the headers, it became practicable to split the sickle bar into two separate halves, each driven from one end by a respective transmission (U.S. Pat. No. 3,577,716 A). The outputs of the transmissions are phase shifted by 180° in order to reduce the vibration induced by the sickle bar, such that the sickle bar halves move in opposite respective directions. It was also proposed to drive the two sickle bar halves from the center of the header by means of a transmission having two 180° phase shifted outputs (U.S. Pat. No. 5,497,605 A), or to drive a sickle bar half from one side and have a transmission at the center of the header providing the 180° phase shift for the other half of the sickle bar (U.S. Pat. No. 6,889,492 B). Another prior art proposal is to drive the sickle bar halves with separate hydraulic motors that are electronically synchronized to provide the phase offset (U.S. Pat. No. 7,658,059 B).

The proposal with the two transmissions requires a slip-free connection between the feeder house output and the transmissions in order to avoid a de-synchronization of the sickle bar halves. This requires use of rigid shafts which are relatively heavy and can only be implemented with expensive telescopic shafts in case that the platform is extendable, i.e. comprises a rear part releasably connected to the feeder house and a front part that can be extended forward with respect to the rear part, in order to adapt the platform for harvesting special crops, like rape. The central drive requires drive train elements connected to the feeder house output beneath the platform, where only limited space is available. The proposal with the phase shifting transmission requires a relatively large and thus expensive transmission sufficient to drive the entire sickle bar, while the hydrostatic drive is complex and expensive.

It is thus an object of the present invention to provide a drive assembly for an agricultural harvesting platform that avoids or reduces the mentioned disadvantages.

SUMMARY

In accordance with a first aspect of the invention, a drive arrangement for driving two sickle bar sections of a harvesting platform comprises a first transmission having an output drivingly connected to a first end of a first sickle bar section for reciprocating the first sickle bar section, a second transmission having an output drivingly connected to a first end of a second sickle bar section for reciprocating the second sickle bar section, a first drive train drivingly connecting an input of the first transmission to an input drive shaft and a second drive train drivingly connecting an input of the second transmission to the input drive shaft. At least one of the first drive train and the second drive train comprises a belt drive, and is thus subject to slippage. Without further measures, both sickle bar sections would thus reciprocate in any possible phase relation, inducing undesired vibration to the platform. For this reason, a synchronization transmission is provided having a first input drivingly connected to a second end of the first sickle bar section and a second input drivingly connected to a second end of the second sickle bar section. The synchronization transmission couples the first input in an opposite movement direction to the second input. Thus, the forces for reciprocating at least one of the sickle bar sections are provided by the belt drive, but the synchronization transmission provides and assures the desired 180° phase shift between the first and second sickle bar section.

In an embodiment, the synchronization transmission comprises a first angled member having a first, forwardly extending arm connected to the second end of the first sickle bar section and a second angled member having a first, forwardly extending arm connected to the second end of the second sickle bar section, both members supported to rotate around a vertical axis and having a respective, transversely extending second arm with outer ends, a lug at the outer end of the second arm of the first member engaging into a recess at the outer end of the second arm of the second member.

The outer end of the second arm of the first member may comprise a plurality of lugs spaced in the forward direction and the outer end of the second arm of the second member may comprise a plurality of recesses spaced in the forward direction into which the lugs of the outer end of the second arm of the first member engage.

In another embodiment, at least one of the lugs and recesses is provided in a plate mounted by a bolt to the respective arm, the bolt providing an overload protection.

In another embodiment, the synchronization transmission comprises a first angled member having a first, forwardly extending arm connected to the second end of the first sickle bar section and a second angled member having a first, forwardly extending arm connected to the second end of the second sickle bar section, both members supported to rotate around a vertical axis and having a respective, transversely extending second arm with outer ends, wherein a link is connected pivotally around a vertical axis to the outer end of the second end of the first arm and connected pivotally around a vertical axis to the outer end of the second end of the second arm. The link is additionally pivotally supported around a vertical axis at its center.

According to a second aspect of the invention, a harvesting platform is provided that can be moved in a forward direction over a field for harvesting crop. The platform comprises a frame having a forward edge on which two sickle bar sections are mounted side-by-side and a drive system as described above.

The frame comprises a rear part for releasably coupling to a feeder house and a front part mounting the two sickle bar sections, wherein the front part can be adjusted in the forward direction with respect to the rear part. In this embodiment, the first drive train and the second drive train each comprises a belt drive with a first sheave supported on the rear part and a second sheave on the front part.

According to a third aspect of the invention, a self propelled harvesting machine comprises a body supported on ground engaging means, a feeder house with a power take off interface and a harvesting platform as described, coupled to the feeder house, wherein the power take off interface is connected to the input drive shaft.

BRIEF DESCRIPTION OF THE DRAWINGS

FIG. 5 is a perspective view of a third embodiment of a synchronization transmission of the drive arrangement.

DETAILED DESCRIPTION

Figure 1:
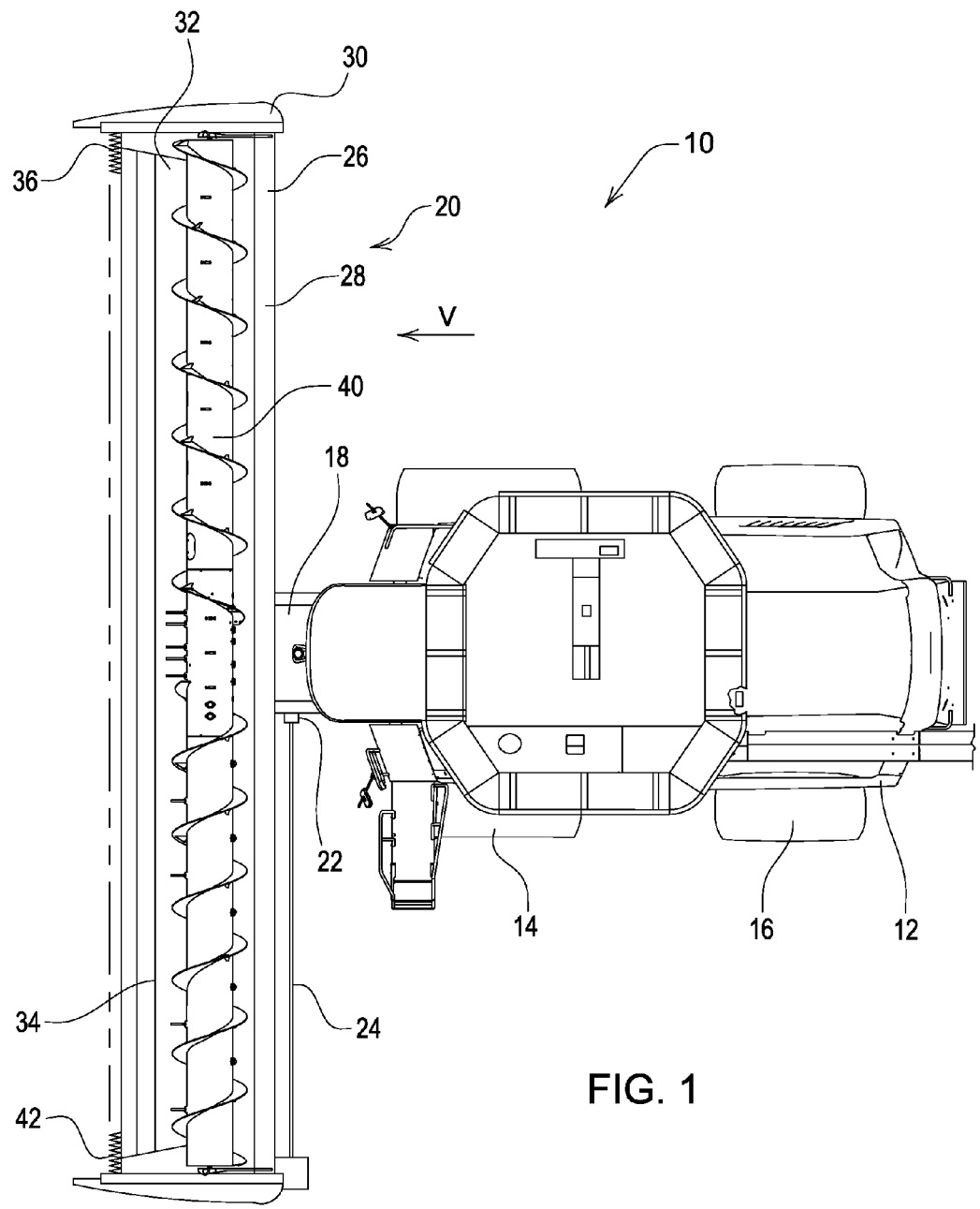
FIG. 1 is a top view of an agricultural harvesting machine mounting a harvesting platform.

In FIG. 1, a self-propelled harvesting machine 10 is shown in a top view. The self-propelled harvesting machine 10 is a combine comprising a body 12 supported on driven front ground engaging means (wheels) 14 and rear ground engaging means (wheels) 16. During a harvesting operation, the self-propelled harvesting machine 10 drives in the forward direction indicated by arrow V, thus into the left direction in FIG. 1. On its forward end, body 12 supports a feeder house 18. On the forward end of the feeder house 18, a harvesting platform 20 is releasably mounted, such that the harvesting platform 20 can be deposited on a trailer (not shown) and disconnected from the feeder house 18 for road transport. Feeder house 18 comprises a power take-off interface 22 to which an input drive shaft 24 for driving driven components of the harvesting platform 20 is removably connected. During harvesting, the harvesting platform 20 cuts and gathers crop from a field and feeds it to the feeder house 18. Feeder house 18 conveys the crop into the interior of the body 12 where it is threshed, separated and cleaned and finally the clean grain is deposited in a grain tank from where it can be unloaded onto a transport vehicle.

Harvesting platform 20 is extendable and comprises a rear part 26 with a frame 28 connected to the feeder house 18 and sidewalls 30, and a front part 32 with a bottom plate 34, a sickle bar section 36 and a sickle bar section 42. The front part 32 with the bottom plate 34, the sickle bar section 36, and the sickle bar section 42 can be adjusted in the forward direction with respect to the rear part 26 by means of hydraulic actuators (not shown). The rear part 26 further comprises a transverse auger 40 and a reel (not shown). Regarding details of the extension mechanism of the harvesting platform 20, reference is made to DE 10 2012 204 869 A1, U.S. Pat. No. 7,082,742 B2 and U.S. Pat. No. 7,730,702 B2, the contents of which are incorporated herein by reference.

Figure 2:
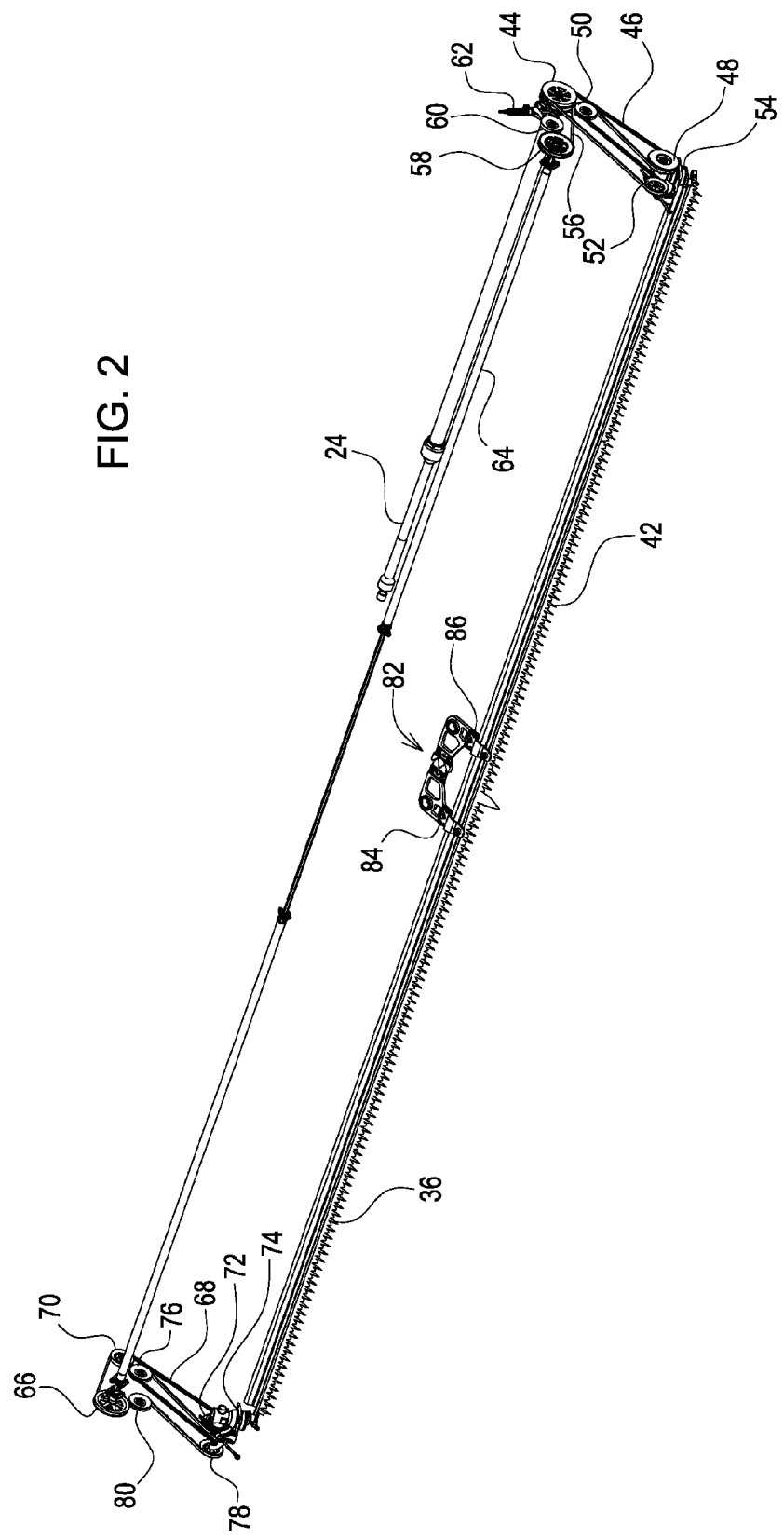
FIG. 2 is a perspective view of a drive arrangement for driving the sickle bar sections of the platform.

FIG. 2 shows the drive arrangement for driving the sickle bar section 36 and the sickle bar section 42 in a reciprocating manner. Input drive shaft 24, which is a telescopic universal joint shaft, is connected on its outer, left end with a dual belt sheave 44 at the left side of the harvesting platform 20. A belt 46 is entrained around the dual belt sheave 44, belt sheave 48, belt sheave 50, and belt sheave 52. The belt sheave 48 drives a gearbox 54 that sets the outer left (first) end of the left (first) sickle bar section 42 of the harvesting platform 20 into reciprocating motion. A suitable embodiment of the gearbox 54 is disclosed in U.S. Pat. No. 7,845,253 B2. The belt sheave 50 and the belt sheave 52 are running idle. The belt sheave 48, the belt sheave 50, and the belt sheave 52, the latter biased by a tensioning spring, are connected to the front part 32 of the harvesting platform 20, such that only the dual belt sheave 44 is connected to the rear part 26, in order to allow the front part 32 to be position-adjusted in the forward direction.

Another belt 56 is entrained around dual belt sheave 44 and drives a belt sheave 58. Belt 56 is tensioned by an idler roller 60 which is biased by a tensioning mechanism 62. Belt sheave 58 drives a transverse shaft 64 which drives a belt sheave 66 on the right side of the harvesting platform 20. Belt sheave 66 drives a belt 68 entrained around belt sheave 70, belt sheave 72, belt sheave 76, belt sheave 78, and belt sheave 80. The belt sheave 72 drives a gearbox 74 that sets outer right (first) end of the right (second) sickle bar section 36 into a reciprocating motion. The belt sheave 70, the belt sheave 76, the belt sheave 78, and the belt sheave 80 are running idle. The belt sheave 72, the belt sheave 76, and the belt sheave 78 are connected to the front part 32 of the harvesting platform 20, with the belt sheave 78 being biased by a tensioning spring, while the belt sheave 66, the belt sheave 70, and the belt sheave 80 are supported on the rear part 26, in order to allow the front part 32 to be position-adjusted in the forward direction.

The first (left) sickle bar section 42 is driven by an output of the gearbox 54, the input of which is driven from the input drive shaft 24 by means of a first drive train comprising a (first) belt drive with the dual belt sheave 44, the belt 46 and the belt sheave 48. Analogously, the second sickle bar section 36 located on the right side is driven by an output of the gearbox 74, the input of which is driven from the input drive shaft 24 by means of a second drive train comprising a (second) belt drive with the dual belt sheave 44, the belt 56, the belt sheave 58, the input drive shaft 24, and a (third) belt drive with belt sheave 66, belt 68 and the belt sheave 72.

Since the belt drives are subject to slippage that would cause that the sickle bar section 36 and the sickle bar section 42 to not be driven continuously in respective opposite directions, i.e. phase shifted by 180°, a synchronization transmission 82 is coupled to the inner (second) ends of the sickle bar section 36 and the sickle bar section 42, respectively. The synchronization transmission 82 may comprise a first input 86 connected to the second end of the sickle bar section 36 and a second input 84 drivingly connected to the second end of the sickle bar section 42. The synchronization transmission 82 couples the first input 86 in an opposite movement direction to the second input 84. Thus, when the first input 86 moves to the left hand side, the second input 84 is forced by the synchronization transmission 82 to move to the right hand side and vice versa. Thus, the sickle bar section 36 and the sickle bar section 42 are forced by the synchronization transmission 82 to move with a 180° phase shift, avoiding undesired vibration of the harvesting platform 20.

Figure 3:
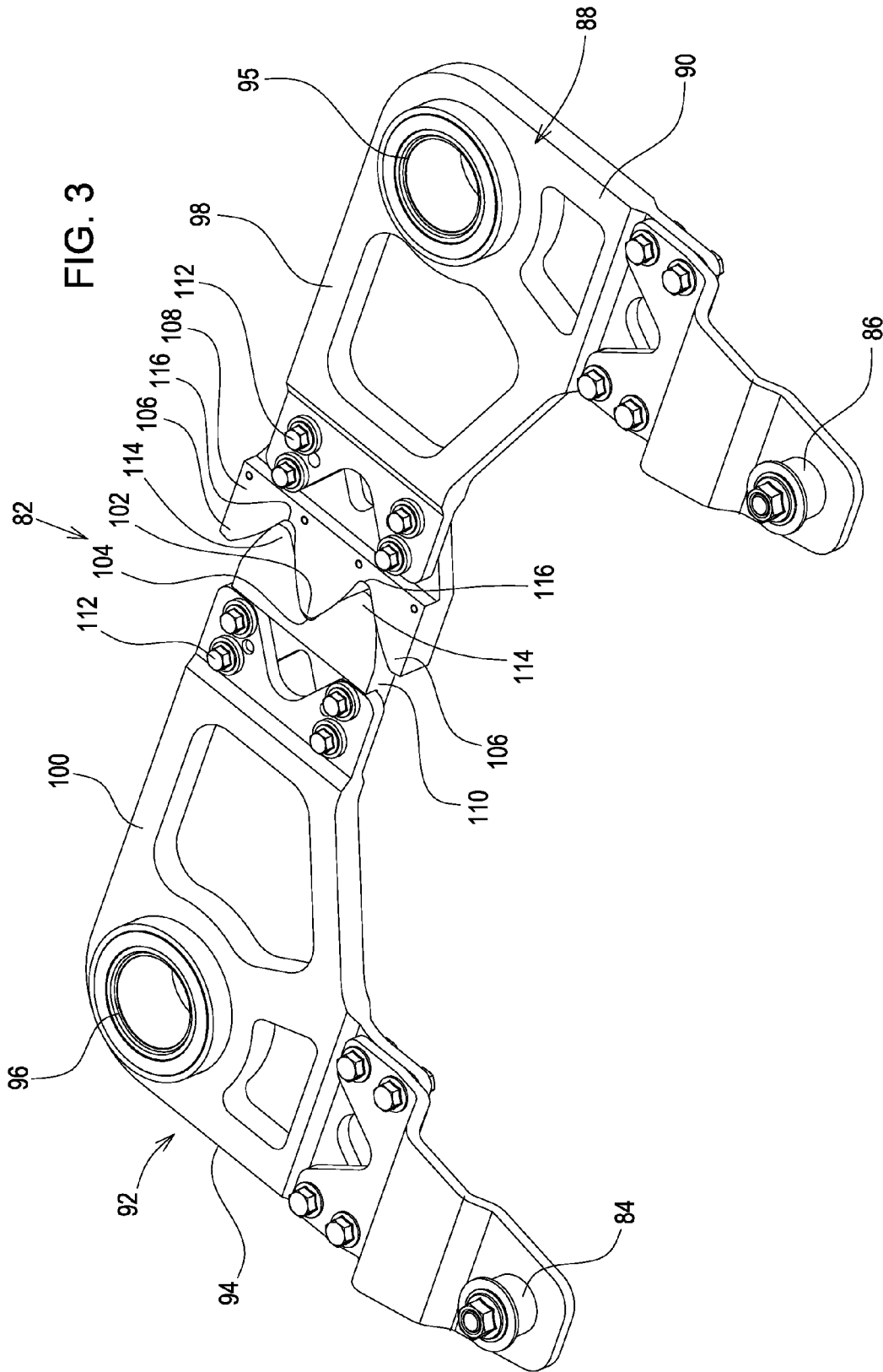
FIG. 3 is a perspective view of a first embodiment of a synchronization transmission of the drive arrangement.

FIG. 3 shows the synchronization transmission 82 of FIG. 2 in an enlarged, perspective view. The synchronization transmission 82 comprises a first angled member 88 having a first, forwardly extending arm 90 connected at the first input 86 to the second (inner) end of the sickle bar section 42 and a second angled member 92 having a first, forwardly extending arm 94 connected to the second (inner) end of the second sickle bar section 36. The first angled member 88 is supported on a frame of the front part 32 at a bearing 95 to rotate around a first vertical axis. The first angled member 88 may comprise a transversely extending second arm 98 with an outer end. The second angled member 92 is supported on a frame of the front part 32 at a bearing 96 to rotate around a second vertical axis. The second angled member 92 may comprise a transversely extending second arm 100 with an outer end.

A plate 108 is mounted by bolts 112 on the outer end of the transversely extending second arm 98. A plate 110 is mounted by bolts 112 on the outer end of the transversely extending second arm 100.

The plate 108 comprises two lugs 106 and a lug 102. The plate 110 comprises two lugs 114. The lugs 106, the lug 102, and the lugs 114 intermesh to define a recess 104 and two recesses 116 defined between the plate 108 and the plate 110.

The lug 102, the lugs 106, and the lugs 114 intermesh with and engage into the recess 104, and the recesses 116. The plate 108 and the plate 110 thus comprise engaging cog wheel segments formed by the lug 102, the lugs 106, the lugs 114 and the recess 104, and the recesses 116 which cause the first, forwardly extending arm 90, and the first, forwardly extending arm 94 to move in opposite directions 180° out of phase.

Figure 4:
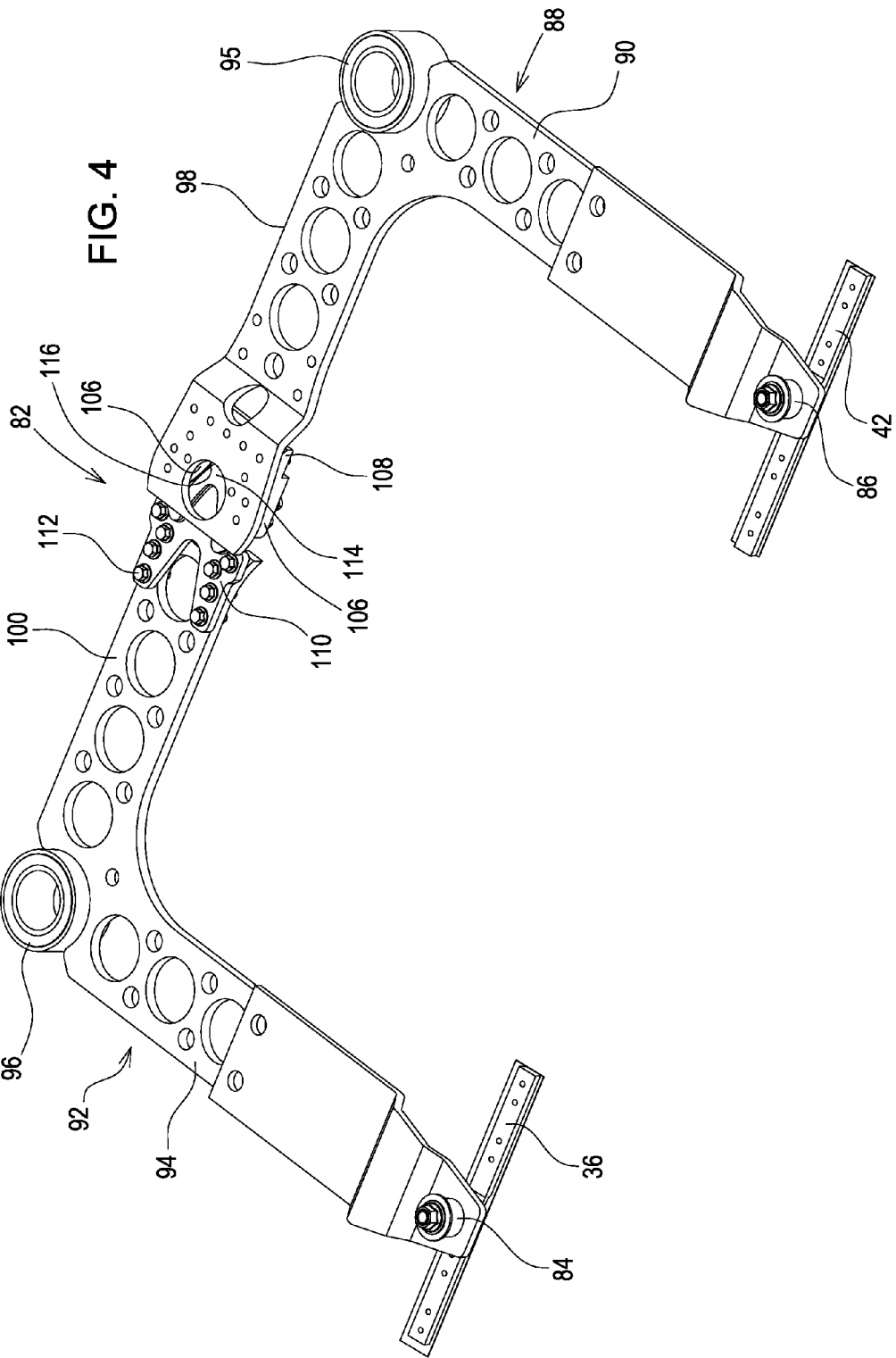
FIG. 4 is a perspective view of a second embodiment of a synchronization transmission of the drive arrangement.

A second embodiment of a synchronization transmission 82 is depicted in FIG. 4. Elements corresponding to the first embodiment of FIG. 3 are assigned the same reference numbers. The main difference is that in the second embodiment, the plate 110 of the second arm 100 comprises only a single lug 114 and the plate 108 of the first angled member 88 comprises only a single recess 116.

A third embodiment of a synchronization transmission 82 is depicted in FIG. 5. Elements corresponding to the first embodiment of FIG. 3 are assigned the same reference numbers. In this embodiment, the adjacent ends of the second arm 98 and the second arm 100 are coupled by a link 118. The link 118 is coupled rotatably around a vertical axis by a bolt 120 to a fork 122 at the end of the second arm 100 of the second angled member 92 and also rotatably coupled around a vertical axis by a bolt 124 to a fork 126 at the end of the transversely extending second arm 98 of the first angled member 88.

The bolts 112 of the first and second embodiment and the bolt 120 and the bolt 124 of the third embodiment of the synchronization transmission 82 serve as an overload protection, since they would break in case that the belt 46, the belt 56, or the belt 68 slips or ruptures. This avoids damage to the gearbox 54 or 74 which otherwise would drive both the sickle bar section 36 and the sickle bar section 42, in particular after the platform drive was stopped and is re-started.

Having described the preferred embodiments, it will become apparent that various modifications can be made without departing from the scope of the invention as defined in the accompanying claims. It should also be noted that the embodiments of the synchronization transmission 82 disclosed herein can also be used with just the gearbox 54 or the gearbox 74. The other gearbox and the corresponding drive train for that gearbox can thus be eliminated assuming that the gearbox that is retained for use is sufficiently dimensioned to drive both the sickle bar section 36 and the sickle bar section 42. It would also be possible to use the synchronization transmission 82 as a central drive for the sickle bar section 36 and the sickle bar section 42, if one of the second arm 98 or the second arm 100 is reciprocated in the forward direction by a transmission (not shown).

In the patent claims herein, the words "a", "an", "one", "1", "two", "2" etc. may be used to indicate a quantity of a particular item or element. The claims were written with the intention that these words should express a minimum quantity. In other words that "three", for example, means "at least three". If the claims herein are intended to cover an absolute number of elements, they will be preceded by the word "only", "just", or "exactly". The use of the term "at least" in the claims herein, is redundant.

We claim:

1. A drive arrangement for driving a first sickle bar section (42) and a second sickle bar section (36) of a harvesting platform (20) so as to reciprocate in opposite first and second directions crosswise to a forward direction of movement, the drive arrangement comprising:

a first gearbox (54) having an input and an output, with the output being drivingly connected to a first end of the first sickle bar section (42) for reciprocating the first sickle bar section (42);

a second gearbox (74) having an input and an output, with the output drivingly connected to a first end of the second sickle bar section (36) for reciprocating the second sickle bar section (36);

an input drive shaft (24);

a first drive train drivingly connecting the input of the first gearbox (54) to the input drive shaft (24);

a second drive train drivingly connecting the input of the second gearbox (74) to the input drive shaft (24), wherein one of the first drive train and the second drive train comprises a belt drive; and a synchronization transmission (82) having a first input (86) drivingly connected to a second end of the first sickle bar section (42) and a second input (84) drivingly connected to a second end of the second sickle bar section (36), the synchronization transmission (82) being configured so as to be responsive to movement of one of the sickle bar sections (36 or 42) in the first direction at one of the first or second inputs (86 or 84) for effecting movement of another of the sickle bar sections (36 or 42) in the second direction.

2. The drive arrangement according to claim 1, wherein the synchronization transmission (82) comprises a first angled member (88) having a first, forwardly extending arm (90) connected to the second end of the first sickle bar section (42) and a second angled member (92) having a first, forwardly extending arm (94) connected to the second end of the second sickle bar section (36), wherein the first angled member (88) and the second angled member (92) are respectively supported to rotate around first and second vertical axes, and respectively include transversely extending second arms (98, 100) with outer ends; a first lug (102) being provided at the outer end of the transversely extending second arm (98) of the first angled member (88) and a recess (104) being provided at the outer end of the transversely extending second arm (100) of second angled member 92, with the first lug (102) engaging into the recess (104) at the outer end of the second arm (100) of the second angled member (92).

3. The drive arrangement according to claim 1, wherein the synchronization transmission (82) comprises a first angled member (88) having a first, forwardly extending arm (90) connected to the second end of the first sickle bar section (42) and a second angled member (92) having a first, forwardly extending arm (94) connected to the second end of the second sickle bar section (36), wherein the first angled member (88) and the second angled member (92) are respectively supported to rotate around first and second vertical axes, with the outer end of the transversely extending second arm (98) of the first angled member (88) including a plurality of lugs (102, 106) spaced from each other in the forward direction of movement and defining a pair of recesses (116) and the outer end of the second arm (100) of the second angled member (92) including a pair of lugs (114) spaced from each other in the forward direction of movement and defining a third recess (104), with the pair of recesses (116) receiving the pair of lugs (114) of the second arm (100) of the second angled member (92) and the third recess (104) receiving the lug (102) of the outer end of the transversely extending second arm (98) of the first angled member (88).

4. The drive arrangement according to claim 2, wherein a first plate (108, 110) is provided at the outer end of one of the second arms (98, 100); at least one of the lugs (102, 106) and recess 104 is provided in the first plate (108, 110); and a shear bolt (112) mounting the first plate (108, 110) to the outer end of one of the second arms (98, 100) and providing an overload protection.

5. The drive arrangement according to claim 1, wherein the synchronization transmission (82) comprises a first angled member (88) having a first, forwardly extending arm (90) connected to the second end of the first sickle bar section (42) and a second angled member (92) having a first, forwardly extending arm (94) connected to the second end of the second sickle bar section (36), wherein both the first angled member (88) and the second angled member (92) are supported to rotate around first and second vertical axes, respectively, and further wherein the first angled member (88) has a transversely extending second arm (98) with an outer end, and further wherein the second angled member (92) has a transversely extending second arm (100) with an outer end, and further wherein a link (118) is connected to the outer end of the second arm (98) of the first angled member (88) to pivot with respect thereto about a third vertical axis, and further wherein the link (118) is connected to the outer end of the second arm (100) of the second angled member (92) to pivot with respect thereto about a fourth vertical axis.

6. A harvesting platform (20) that can be moved in a forward direction over a field for harvesting crop, the harvesting platform (20) comprising:
   a frame (28) having a forward edge on which a first sickle bar section (42) and a second sickle bar section (36) are mounted; and
   a drive arrangement for driving the first sickle bar section (42) and the second sickle bar section (36) of the harvesting platform (20), including:
   an input drive shaft (24);
   a first gearbox (54) having an output drivingly connected to a first end of the first sickle bar section (42) for reciprocating the first sickle bar section (42);
   a second gearbox (74) having an output drivingly connected to a first end of the second sickle bar section (36) for reciprocating the second sickle bar section (36);
   a first drive train drivingly connecting an input of the first gearbox (54) to the input drive shaft (24);
   a second drive train drivingly connecting an input of the second gearbox (74) to the input drive shaft (24), wherein one of the first drive train and the second drive train comprises a belt drive; and
   a synchronization transmission (82) having a first input (86) drivingly connected to a second end of the first sickle bar section (42) and a second input (84) drivingly connected to a second end of the second sickle bar section (36), the synchronization transmission (82) being configured so as to be responsive to a reciprocating movement of one of the sickle bar sections (36 or 42) in a first direction at one of the first or second inputs (86 or 84) for effecting reciprocating movement of another of the sickle bar sections (36 or 42) in a direction opposite to the first direction.

7. The harvesting platform (20) according to claim 6, wherein the frame (28) comprises a rear part (26) for being releasably coupled to a feeder house (18) and a front part (32) supporting the two sickle bar sections (36, 42), wherein the front part (32) can be adjusted in the forward direction with respect to the rear part (26).

8. The harvesting platform (20) according to claim 7, wherein the first drive train and the second drive train each comprises a belt drive with a first belt sheave (44, 66) supported on the rear part (26) and a second sheave (48, 72) on the front part (32).

9. A self-propelled harvesting machine (10) comprising a body (12) supported on ground engaging means (14, 16), a feeder house (18) with a power take-off interface (22) and a harvesting platform (20) having an input drive shaft (24) coupled to said power take-off shaft interface (22), with the platform (20) including a frame (28) having a rear part (26) releasably coupled to the feeder house (18) and having a front part (32) including a transverse forward edge; a first sickle bar section (36) and a second sickle bar section (42) being supported at said transverse forward edge; said front part (32) being adjustable fore-and-aft with respect to the rear part (26); and a drive arrangement for driving the first sickle bar section (42) and the second sickle bar section (36) of the harvesting platform (20), including:
   a first gearbox (54) having an output drivingly connected to a first end of the first sickle bar section (42) for reciprocating the first sickle bar section (42);
   a second gearbox (74) having an output drivingly connected to a first end of the second sickle bar section (36) for reciprocating the second sickle bar section (36);
   a first drive train drivingly connecting an input of the first gearbox (54) to the input drive shaft (24);
   a second drive train drivingly connecting an input of the second gearbox (74) to the input drive shaft (24), wherein one of the first drive train and the second drive train comprises a belt drive; and
   a synchronization transmission (82) having a first input (86) drivingly connected to a second end of the first sickle bar section (42) and a second input (84) drivingly connected to a second end of the second sickle bar section (36), the synchronization transmission (82) being configured so as to be responsive to a reciprocating movement of one of the sickle bar sections (36 or 42) in a first direction at one of the first or second inputs (86 or 84) for effecting reciprocating movement of another of the sickle bar sections (36 or 42) in a direction opposite to the first direction.

* * * * *